(12) United States Patent
Dreyer

(10) Patent No.: US 7,481,925 B2
(45) Date of Patent: Jan. 27, 2009

(54) WATER FILTRATION SYSTEM HAVING REMOVABLE FILTER PANELS

(75) Inventor: Harold B. Dreyer, Anchorage, AK (US)

(73) Assignee: Gunderboom, Inc., Anchorage, AK (US)

( * ) Notice: Subject to any disclaimer, the term of this patent is extended or adjusted under 35 U.S.C. 154(b) by 247 days.

(21) Appl. No.: 10/972,554

(22) Filed: Oct. 25, 2004

(65) Prior Publication Data

US 2005/0109712 A1  May 26, 2005

Related U.S. Application Data

(60) Provisional application No. 60/513,774, filed on Oct. 23, 2003.

(51) Int. Cl.
*E02B 5/08* (2006.01)
*B01D 29/03* (2006.01)

(52) U.S. Cl. .............. 210/232; 210/154; 210/236; 210/237; 210/170.1; 210/499

(58) Field of Classification Search ............. 210/232, 210/237, 170.01, 170.09, 170.1, 170.11, 210/498, 499, 154, 236
See application file for complete search history.

(56) References Cited

U.S. PATENT DOCUMENTS

| | | | |
|---|---|---|---|
| 1,757,187 A | * 5/1930 | Griffith | 210/305 |
| 1,958,118 A | * 5/1934 | Szegvari | 366/134 |
| 2,486,249 A | 4/1949 | Wadleigh | |
| 2,996,189 A | 8/1961 | Salterbach | |
| 3,477,574 A | * 11/1969 | Malfroy | 209/403 |
| 3,513,978 A | * 5/1970 | Newsteder | 210/167.25 |
| 4,059,528 A | * 11/1977 | Grosshandler | 210/282 |
| 5,575,925 A | * 11/1996 | Logue, Jr. | 210/747 |
| 5,811,003 A | * 9/1998 | Young et al. | 210/388 |

FOREIGN PATENT DOCUMENTS

DE  19815243  * 1/2000

* cited by examiner

*Primary Examiner*—Thomas M Lithgow
(74) *Attorney, Agent, or Firm*—Nixon Peabody LLP

(57) ABSTRACT

A water filtration panel and a system containing the same are disclosed. The water filtration panel include a substantially rigid frame having a first face, a second face, and an inner dimension; a sheet of fabric material that permits water to flow therethrough, the fabric material being secured to the substantially rigid frame in a manner whereby substantially all water passing through the inner dimension of the frame passes through the fabric material; a sealing member connected to the first face of the substantially rigid frame; and an adjustable expansion member contacting the second face of the substantially rigid frame. Also disclosed is a retainer that is used to couple the fabric material to the substantially rigid frame.

33 Claims, 8 Drawing Sheets

WATER FILTRATION SYSTEM HAVING REMOVABLE FILTER PANELS

This application claims the priority benefit of provisional U.S. Patent application Ser. No. 60/513,774, filed Oct. 23, 2003, which is hereby incorporated by reference in its entirety.

FIELD OF THE INVENTION

The present invention relates to a method and apparatus for controlling movement of suspended particulates and/or aquatic life at a water intake site for an industrial water user in a body of water which experiences significant debris, high winds or wave conditions, or other adverse environmental conditions.

BACKGROUND OF THE INVENTION

Industrial plants and power plants utilize water from nearby water sources for cooling purposes. Consequently, a problem of the ingestion of particulates or aquatic life (e.g., fish, fish eggs, larvae, zebra mussels, vegetation, etc.) into the cooling system water intakes by suction, random entry, or other means is created. The same problem exists in any similar facility where water or materials in the water are required for some purpose and are obtained from water bodies containing particulates and/or aquatic life.

Floating barrier or containment/exclusion boom systems have been installed at these water intakes to deal with these problems of ingestion. This design is optimal for most situations, but problems arise when the body of water has a significant amount of natural debris, flotsam and jetsam, etc., which can impact onto the boom and or build up against the boom, either damaging or stressing the system, or both. Additionally, high currents or wave conditions can damage a typical boom. In a location where these conditions exist with some degree of regularity, the floating containment boom would undergo severe weathering and damage. This leads to the need to demobilize the boom to affect its repair and, as a result, thereby expose the water intake to particulates, aquatic life, or debris that otherwise would have been excluded in large part.

Thus, it would be advantageous to have a marine life exclusion system that can withstand these environmental forces, allow for repair, simplified maintenance and replacement of damaged panels without demobilizing the entire containment/exclusion system.

The present invention is directed toward overcoming these deficiencies.

SUMMARY OF THE INVENTION

A first aspect of the present invention relates to a water filtration panel including: a substantially rigid frame having a first face, a second face, and an inner dimension; a sheet of fabric material that permits water to flow therethrough, the fabric material being secured to the substantially rigid frame in a manner whereby substantially all water passing through the inner dimension of the frame passes through the fabric material; a sealing member connected to the first face of the substantially rigid frame; and an adjustable expansion member contacting the second face of the substantially rigid frame. The water filtration panels are intended to be used in a suitably configured support structure (of a water filtration system) that contains panel receiving slots, whereby adjustment of the expansion member forces the sealing member against a cooperating surface of the panel receiving slot to achieve desired flow of water through the inner dimension of the frame (in which case it is filtered) rather than between the frame and the support structure.

A second aspect of the present invention relates to a water filtration system including: a rigid structure that defines a panel receiving slot having first and second cooperating surfaces; a water filtration panel according to the first aspect of the present invention which is positioned in the panel receiving slot with the sealing member confronting the first cooperating surface and the expansion member confronting the second cooperating surface, whereby adjustment of the expansion member applies a force between the second face and the second cooperating surface to urge the sealing member to contact the first cooperating surface.

A third aspect of the present invention relates to a retainer adapted for connection to the frame of a water filtration panel, the retainer comprising opposed first and second sides, an inner edge, and a plurality of spaced passages formed between the first and second sides, the first side having a first recess formed therein, and the inner edge having a rabbet formed at the junction of the inner edge and the first side, the rabbet communicating with the first recess.

A fourth aspect of the present invention relates to a method of filtering intake water including: installing in a body of water a substantially rigid structure that defines a filtration zone in which a water intake pipe resides, the substantially rigid structure including a panel receiving slot having first and second cooperating surfaces; installing a water filtration panel according to the first aspect of the present invention into the panel receiving slot with the sealing member confronting the first cooperating surface and the expansion member confronting the second cooperating surface; adjusting the expansion member to apply a force between the second face and the second cooperating surface to urge the sealing member to contact the first cooperating surface; and drawing water into the water intake pipe, whereby substantially all water is thereby drawn through the fabric material before entering the filtration zone, thereby filtering the water.

Through the use of expansion members, it becomes possible to easily install and remove filter panels from the panel receiving slot. A single operator can effectively manipulate the expansion member in a short amount of time, without the need for entering the water. In addition, a retainer of the present invention allows for easy replacement of torn or worn fabric material from a removed panel member.

BRIEF DESCRIPTION OF THE DRAWINGS

In FIG. 3A a portion of the expansion member has been removed to illustrate the positioning of a plurality of wedge members (one component of the expansion member) secured to a face of the substantially rigid frame. FIG. 3B is an enlarged view of the region identified in FIG. 3A.

FIGS. 6A-B show the movement of the carriage(s) between a first position (FIG. 6A), when the expansion member is in an unexpanded state, and a second position (FIG. 6B), when the expansion member is in an expanded state. Not only does the carriage move downwardly relative to the substantially rigid frame, but the carriage moves away from the substantially rigid frame under influence of the first and second wedge members.

DETAILED DESCRIPTION OF THE INVENTION

The present invention relates generally to a water filtration panel and a water filtration system that contains the same. The water filtration system of the present invention is particularly well suited for use in the filtration of water for industrial water intake structures.

Figure 1:
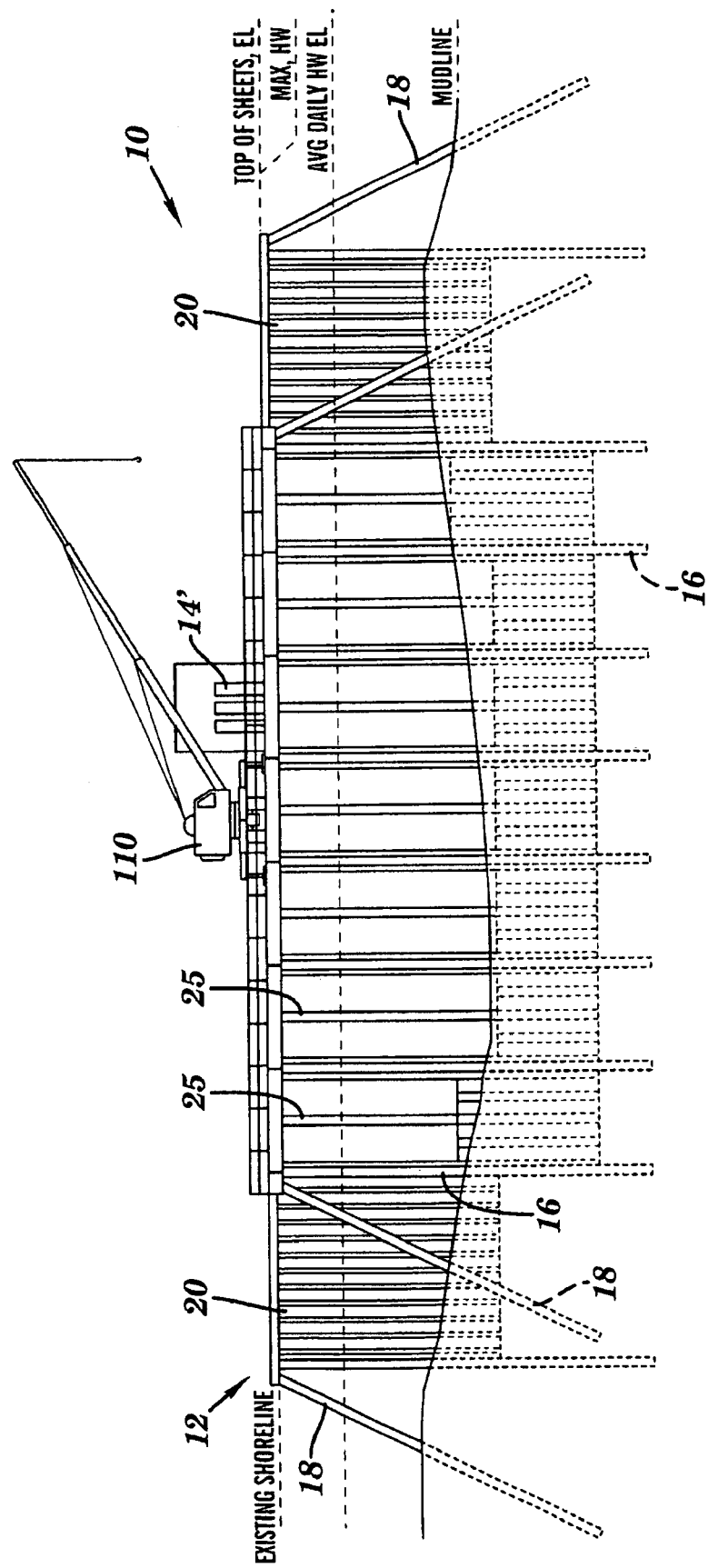
FIG. 1 is an environmental plan view of a water filtration system according to the present invention.
Figure 2:
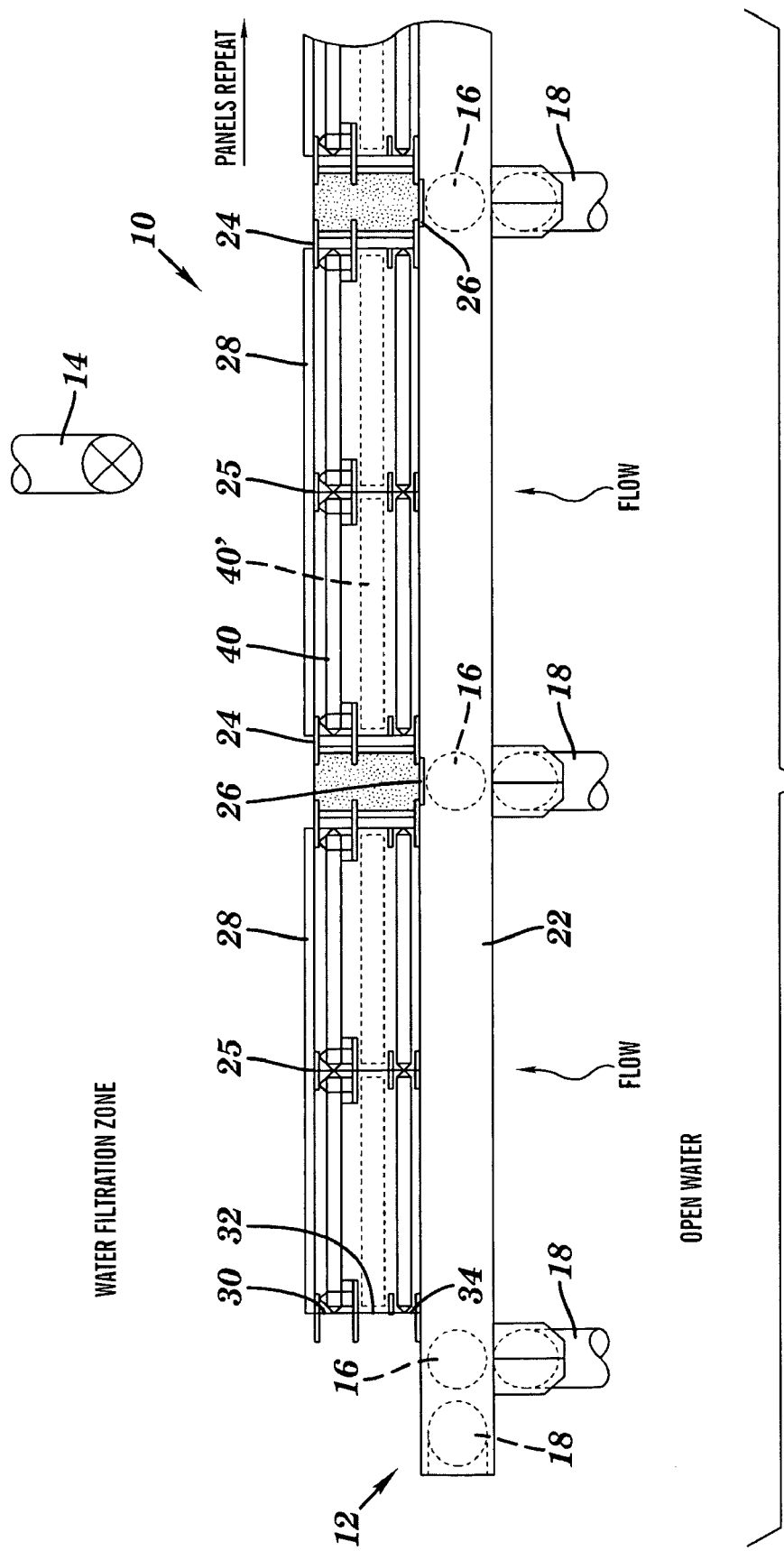
FIG. 2 is a partial plan view of the water filtration system, showing location of the intake structure within the water filtration zone defined by the system installed in an open body of water.

With reference to FIGS. 1 and 2, a water filtration system 10 of the present invention includes a substantially rigid structure 12 that defines a perimeter and defines a water filtration zone in which one or more water intake structures 14,14' exist. The substantially rigid structure 12 is preferably formed by a combination of a plurality of vertical pilings 16, a plurality of batter pilings 18, sheet piling wall sections 20, a plurality of substantially horizontal girders (i.e., box beam top caps and bottom plates) 22, a plurality of substantially vertical connecting girders 24, and a plurality of substantially vertical midplate girders 25. Each of the vertical girders 18 is connected to at least one of either the vertical pilings or the horizontal girders, or both, using suitable mechanical connections capable of withstanding the marine environment. Typically, such connections include welded joints and seams, as well as mechanical connectors. Between connecting girders 24 are pairs of sheet piling interlocks 26, which serve to connect the structure between two adjacent connecting girders. Further support for the support structure is provided by a number of angle braces 28 that are welded to the vertical girders 24, 25. Optionally provided atop the box beam top caps is a catwalk or the like. The substantially rigid structure is preferably formed of steel components of suitable dimension to afford structural integrity under the intended requirements of use. Generally, this includes approximately 24 inch pipe pilings, 1 inch thick vertical girders, half inch thick horizontal girders, etc., although less or more durable materials can also be utilized.

Cooperating connecting girders 24 and midplate girders 25 together define (i.e., between each pair thereof) at least one panel receiving slot. As shown in FIG. 2, for example, the girders together define a first panel receiving slot 30, a second panel receiving slot 32, and bar rack receiving slot 34. Each of the connecting girders 24 and midplate girders 25 is characterized by a modified I-beam construction. In particular, the girders include both end flanges and internal flanges that form surfaces against which the panels engage. Consequently, the vertical girders collectively form a first set of panel receiving slots laterally spaced apart from one another along the length of the rigid structure, a second set of panel receiving slots laterally spaced apart from one another along the length of the rigid structure, and an optional third set of bar rack receiving slots laterally spaced apart from one another along the length of the rigid structure. The various receiving slots are coaligned to form pairs of first and second panel receiving slots which cooperate with a single bar rack receiving slot. The water filtration panels 40,40' can be present in one or both of the first and second panel receiving slots for each pair thereof (or combinations thereof). This is illustrated in FIG. 2. As shown in greater detail in FIGS. 3 and 4, the flanges that form the panel receiving slots afford first and second cooperating surfaces 36, 38, respectively, that engage portions of the filtration panels as described hereinafter.

Each of the portions of the girders that form panel receiving slots is preferably coated with an ultrahigh molecular weight polyethylene 39. The coating should be suitable to allow for removal of panels from the slots, while also protecting the steel forming the slot against deterioration during removal and insertion of the panels, and facilitating formation of a seal against the surface thereof (as discussed below). The polyethylene also results in easier cleaning of the structure given that the polyethylene resists biofouling. By way of example, applicants have found that approximately ⅜ inch thick polyethylene is suitable for these purposes, although lesser or greater thicknesses can also be used.

Referring now to FIGS. 2-7, the water filtration system further includes one or more water filtration panels 40,40'. Each water filtration panel 40,40' includes a substantially rigid frame 42, a sheet of fabric material 44, a sealing member 46, and an adjustable expansion member 48.

Figure 3A:
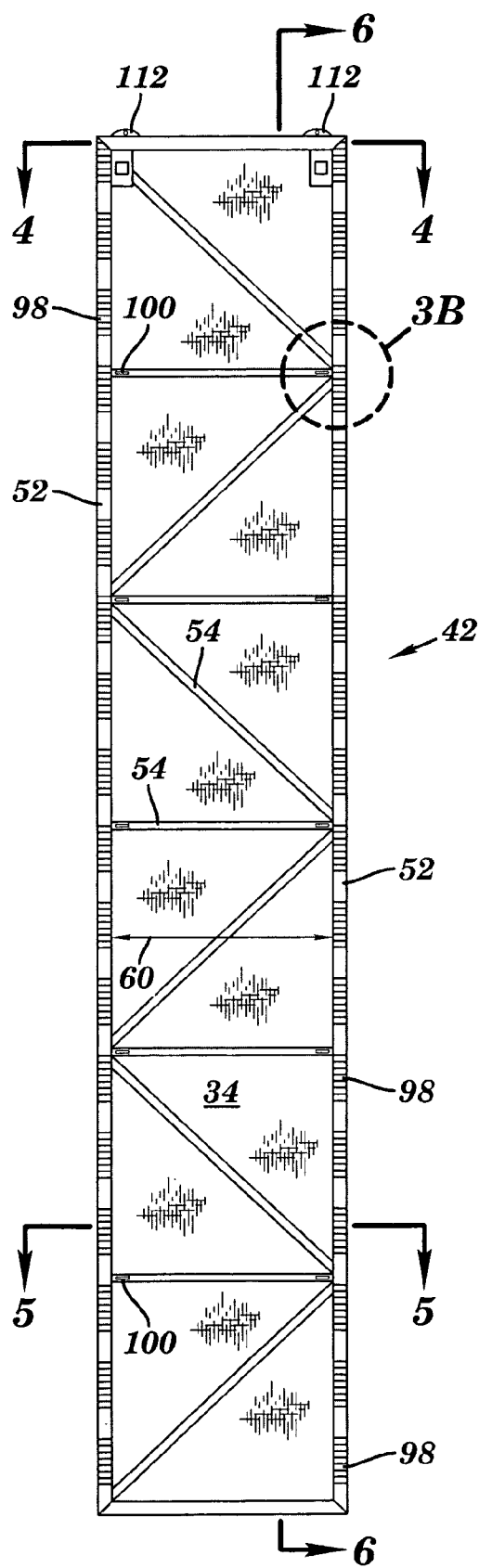
FIGS. 3A-B show an elevational view of a water filtration panel.
Figure 3B:
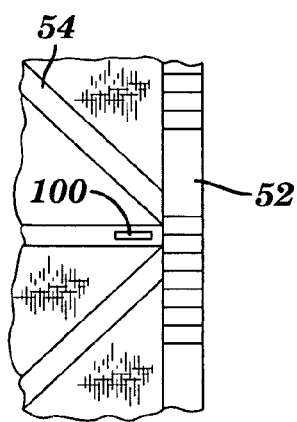

The frame 42 is preferably formed of approximately 6 inch by 6 inch steel square tubing 52 about its perimeter, with approximately 3.5 inch by 3.5 inch cross-braces 54 welded thereto. As shown in FIG. 3, the frame 42 is elongate and has a rectangular shape, although virtually any geometric configuration can be fabricated in accordance with the present invention. To facilitate the elongate shape, rigidity can be achieved using the plurality of braces 54 that span the inner dimension thereof (i.e., either parallel to the ends or diagonally). The frame 42 is characterized by having a first face 56 (see FIG. 4), a second face 58 (see FIG. 4), and an inner dimension 60 (see FIG. 3). The lateral edges of the frame 42 are further characterized by the presence of a bumper 61 secured thereto, either by marine adhesive or mechanical connector.

The sheet of fabric material 44 is any fabric material, whether woven or nonwoven, that permits water to flow therethrough. As described in greater detail below, the fabric material is secured to the substantially rigid frame either directly or indirectly (shown) in a manner whereby substantially all water passing through the inner dimension of the frame passes through the fabric material (i.e., little or no water passes around the fabric material).

Basically, the fabric material can be any suitable fabric material that is sufficiently durable to handle the stresses of containing particulate debris or contaminants. Preferred fabric materials are geosynthetic fabrics. Geosynthetic fabrics are formed of polymeric materials and can be either woven or non-woven. The geosynthetic fabric is "water-pervious," meaning that water passes through the fabric and is not absorbed by the fabric.

Typically, the geosynthetic fabric will also be "oleophilic," meaning that it absorbs or attracts oil (more generally, hydrocarbons), thereby blocking the flow of oil, but allows water to flow therethrough. For containment of silt and other suspended particulates, it is not essential that the sheet of fabric material be oleophilic. However, many pollutants are hydrocarbon-based and to prevent intake of those pollutants, the fabric material preferably is oleophilic.

Useful geosynthetic fabrics are further characterized by high load distribution capacity, the ability to abate material filtration, and permeability to water. Geosynthetic fabrics are commercially available in a range of tensile strengths, permeabilities, and permitivities, and are useful for the purposes of the invention throughout those ranges.

The geosynthetic fabrics are nonbiodegradable, so they do not deteriorate due to environmental exposure. During prolonged use, exposure to ultraviolet (UV) light may cause some geosynthetic fabrics to weaken or deteriorate. However, UV-resistant fabrics are commercially available as well as UV resistance treatment methods.

Geosynthetic fabric may be prepared using one or a combination of various polymers, for example polyester, polypropylene, polyamides, and polyethylene. Most commercially available geosynthetic fabrics are polypropylene or polyester. Examples of suitable nonwoven geosynthetic fabrics include, but are not limited to, AMOPAVE® 4399, AMOPAVE® HD 4597, 4545, 4553, and 4561 (all polypropylene fabrics commercially available from Amoco Fabrics and Fibers Company); Typar®, a polypropylene fabric commercially available from Dupont; and TREVIRA® Spunbond, a polyester fabric commercially available from Hoechst Fibers Industries. Examples of suitable woven geosynthetic fabrics include, but are not limited to, 1380 SILT STOP®, 1198, 1199, 2090, 2000, 2006 (all polypropylene fabrics commercially available from Amoco Fabrics and Fibers Company).

The fabric material can be formed of a single layer of fabric material or multiple layers of flexible fabric material. Where multiple layers are employed, the layers can be formed of the same or different flexible fabric material. For example, and without limitation, an inner layer can be formed of a first fabric material having a particular pore size while an outer layer can be formed of a second fabric material having a different pore size. Alternatively, the layers of fabric material can have different properties other than their pore size, such as an inner layer that is not oleophilic but an outer layer than is oleophilic, an inner layer that is woven and an outer layer than is non-woven, or vice versa. Various combinations can be utilized without departing from the scope of the present invention.

Where multiple sheets of fabric material are used, a gas injection system can be employed to facilitate clearing of debris from the fabric material. One such gas injection system is disclosed in U.S. Pat. No. 6,485,229 to Gunderson et al., which is hereby incorporated by reference in its entirety.

Figure 4:
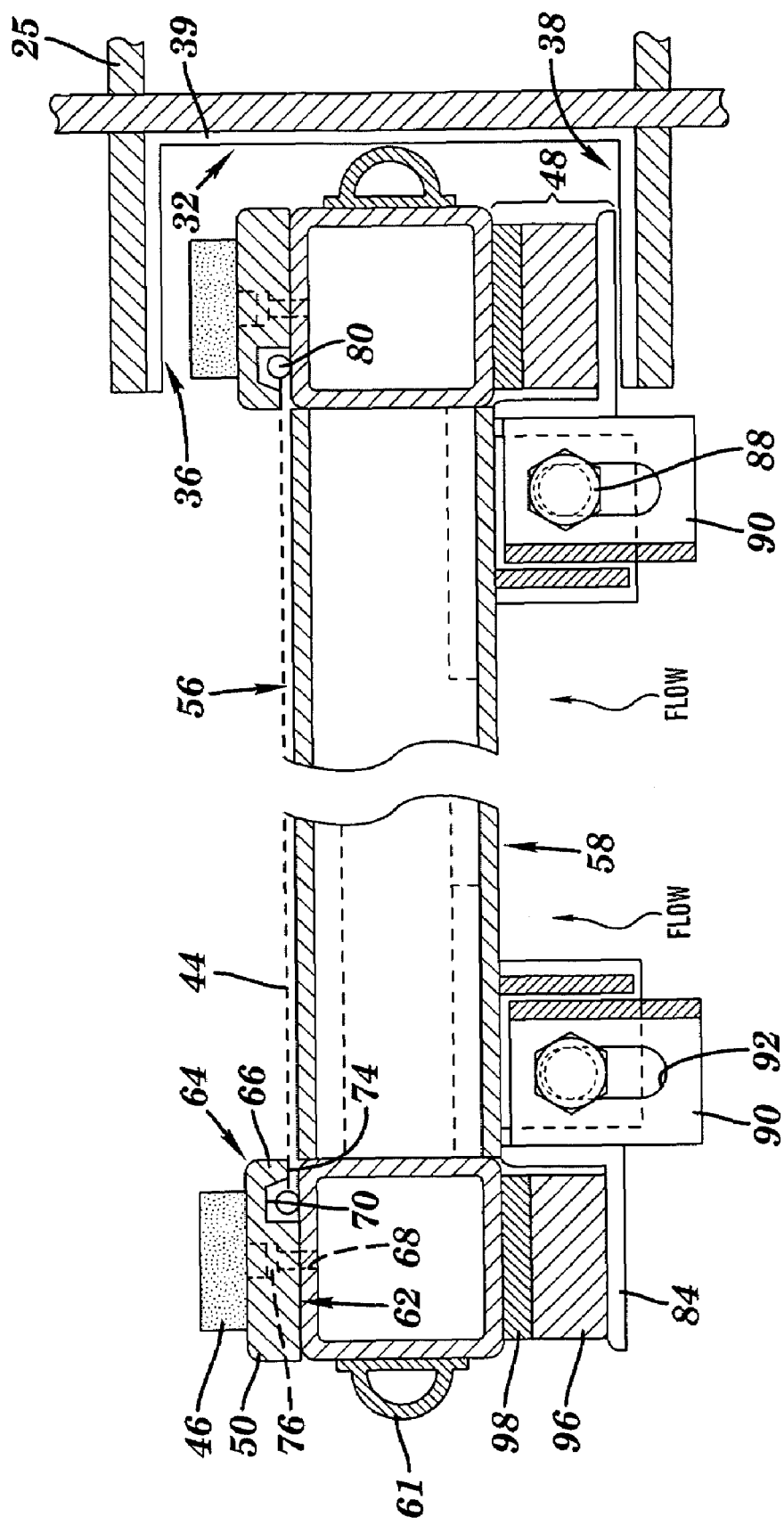
FIG. 4 is a cross-sectional view along lines 4-4 of FIG. 3A, with the expansion member fully illustrated in this view. The expansion member is shown in an unexpanded state or condition.
Figure 5:
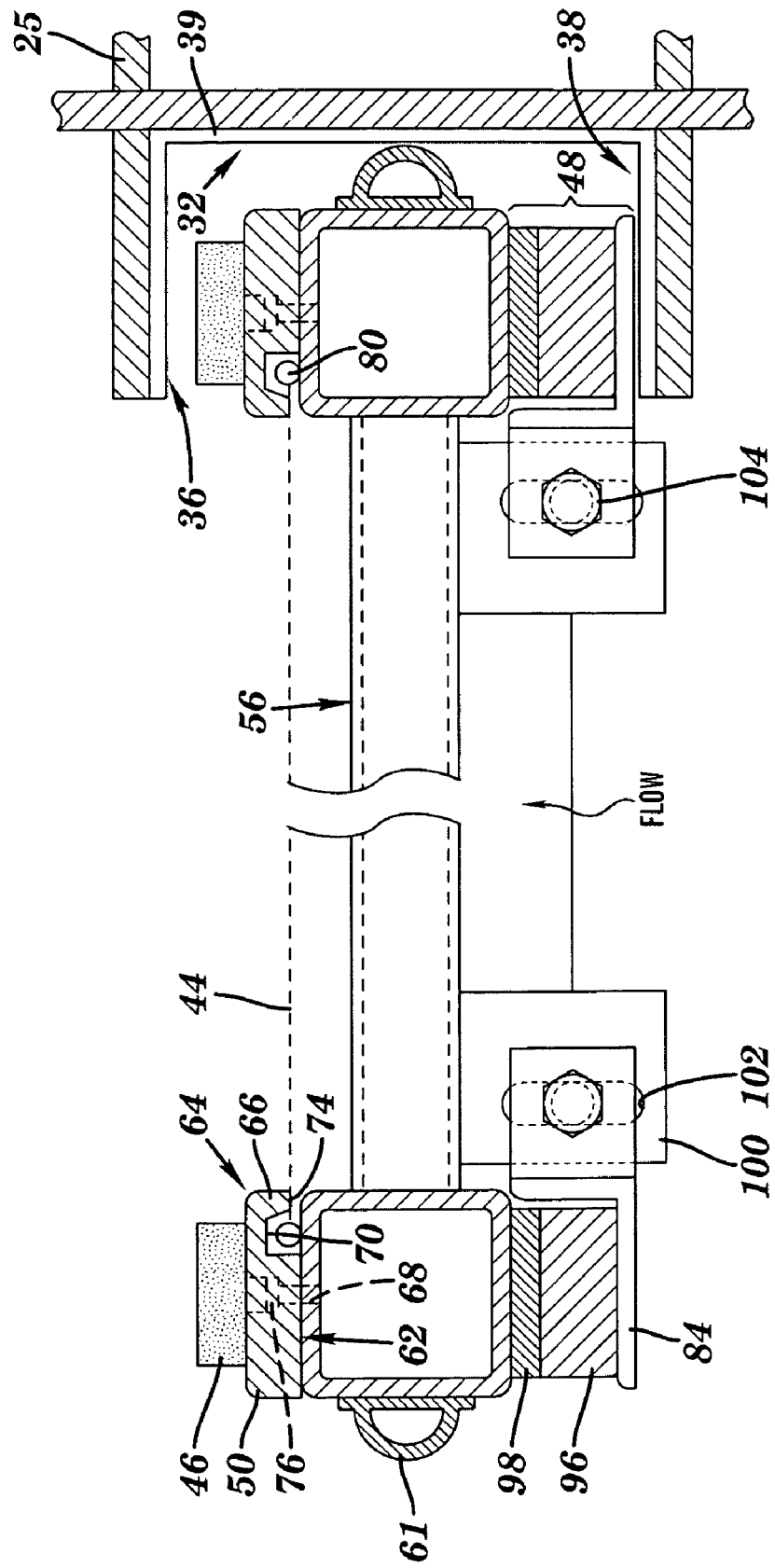
FIG. 5 is a cross-sectional view along lines 5-5 of FIG. 3A, with the expansion members fully illustrated in this view. The expansion member is shown in an unexpanded state or condition.

According to a preferred embodiment, the filter panel 40 further includes a retainer 50 that cooperates with the fabric material 44 to retain it against the substantially rigid frame 42. As shown in FIGS. 4 and 5, the retainer 50 is characterized by having opposed first and second sides 62, 64, an inner edge 66, and a plurality of spaced passages 68 formed between the first and second sides. The first side is intended to be positioned against the substantially rigid frame and has a first recess 70 formed therein. The second side may have a second recess 72 (see FIG. 8) formed therein that receives the sealing member 46. The inner edge has a rabbet 74 formed at the junction of the inner edge and the first side, the rabbet communicating with the first recess 70. A plurality of connectors 76 (e.g., stainless steel inserts that receive stainless steel bolts) each extend through one of the plurality of passages to connect the retainer 50 to the substantially rigid frame 42.

To facilitate the preferred rectangular frame 42, the retainer 50 can be a single piece that is appropriately sized and shaped to correspond to the frame. Alternatively, the retainer can be in the form of several elongate retainer pieces shaped and configured to abut one another at the corners of the rectangular frame, such as by way of mitred joints. The retainer can be formed of any suitable material, but durable, extruded thermoplastic materials are preferred.

The recess 70 is disposed to receive and retain the lateral edge of the fabric material 44. To facilitate the retention of the fabric material, the sheet of fabric material includes a sleeve formed about the perimeter thereof, the sleeve containing a locking member 80 that extends about substantially the entire perimeter. The sleeve can be formed by folding the fabric material onto itself and securing the fabric to itself. The connection can be formed using sewn, heat fused, sonically welded seams or any other suitable means. The locking member 80 is characterized by a dimension that is larger than the dimension of the rabbet; hence the configuration of the retainer precludes removal of the sleeve and locking member from recess 70 while the retainer 50 is secured to the frame 42. The locking member 80 can also be configured to conform to the shape of recess 70.

Exemplary locking members 80 can be, without limitation thereto, cylindrical plastic rods (which are relatively inflexible) or nylon rope or the like (which is flexible).

To preclude tearout of the fabric material, the region that forms the sleeve can be reinforced with a reinforcing fabric that overlaps the fabric material forming the sleeve. The reinforcement can be formed using sewn, heat fused, or sonically welded seams. An exemplary reinforcing fabric material is a geosynthetic commercially available as XR-5.

Figure 8:
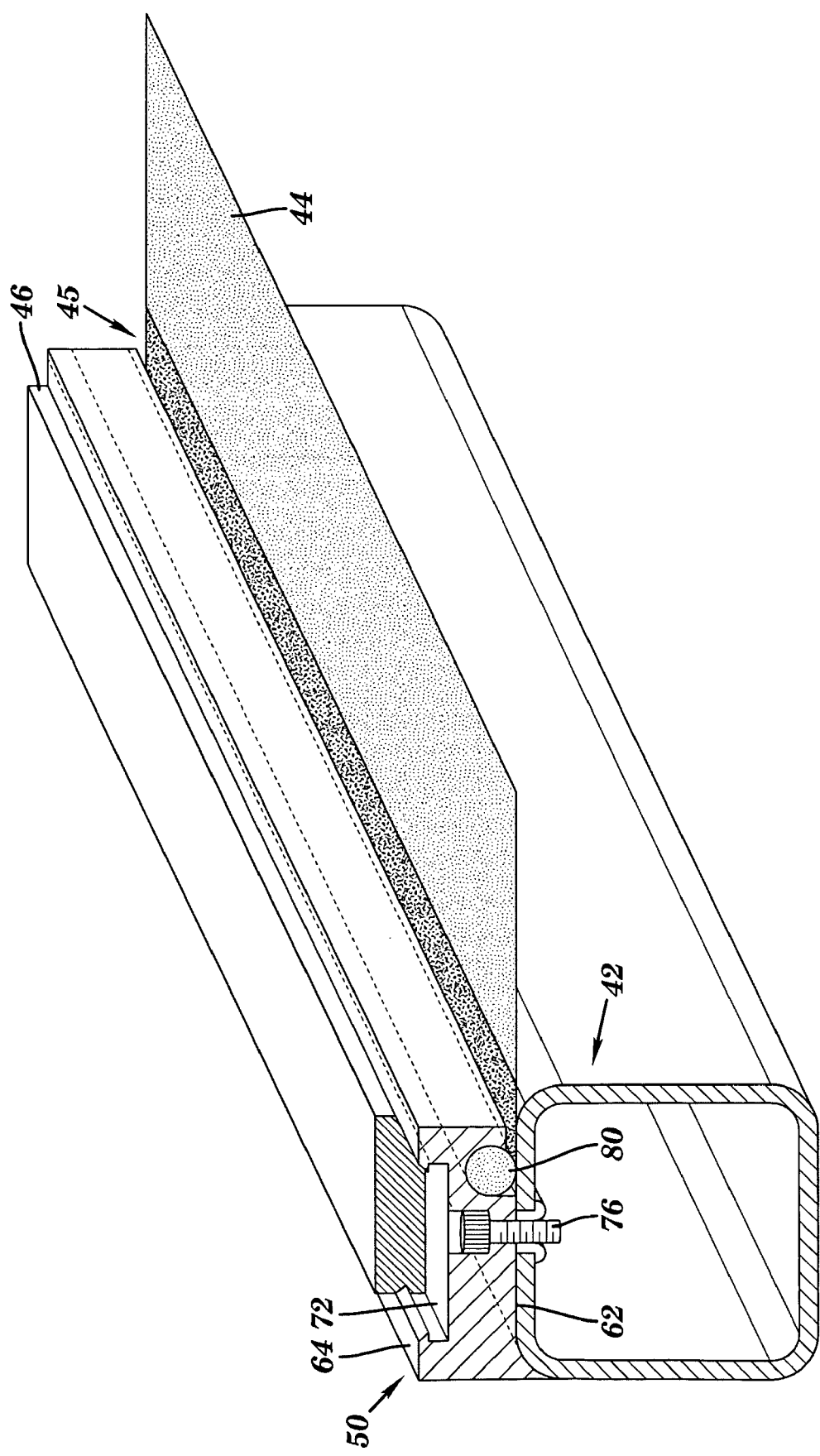
FIG. 8 is a perspective view of a preferred retainer adapted for connection to the substantially rigid frame.

The first side 62 of the retainer is preferably shaped and configured to conform to the contour of the rigid frame. As shown in FIG. 8, the substantially square steel tube that forms a portion of the frame has rounded corners. As a result, the first surface of the retainer is characterized by a first region that is substantially planar and a second region that has a surface (non-uniformly) sloping away from the substantially planar first region, with the second region forming a junction with the outer edge of the retainer.

The sealing member 46 is connected to the first face of the substantially rigid frame via the retainer 40 and confronts the first cooperating surface 36. The sealing member 46 can be secured to the second side 64 of the retainer 50 using a suitable marine adhesive or the like (as shown in FIGS. 4, 5) or the second side of the retainer can be provided with recess 72, which is defined by lateral edges each of which forms a shoulder that physically retains the sealing means positioned in the recess (see FIG. 8). The sealing member 46 is preferably formed of a resilient foam material. An exemplary resilient foam material is a foam neoprene.

The adjustable expansion member 48 is positioned between the second face 58 of the substantially rigid frame 42 and the second cooperating surface 38 of the panel receiving slots 30, 32. The expansion member 48 is formed of an elongate carriage 84 connected to the substantially rigid frame and adjustable between a first position and a second position along the length of the substantially rigid frame. Adjustment of the carriage 84 is accomplished by the interaction of an internally threaded coupler nut 86 secured to the substantially rigid frame 42 and a rotatable carriage bolt 88 secured to the carriage, the carriage bolt having an externally threaded portion engaging the coupler nut, whereby rotation of the carriage bolt causes the expansion member to move between the first and second positions. The carriage bolt 88 is secured to the carriage by a retaining plate 90 having a slot 92 formed therein, the retaining plate being secured to the carriage with the rotatable carriage bolt passing through the slot.

The expansion member 48 further includes at least one first wedge member 96 connected to the carriage with a tapered surface thereof facing the second face of the substantially rigid frame and at least one second wedge member 98 connected to the second face of the substantially rigid frame with the tapered surface thereof at least partially confronting the tapered surface of the at least one first wedge. Upon adjustment of the carriage between the first position to the second positions, the adjustment moves the at least one first wedge member relative to the at least one second wedge member, thereby contracting or expanding the expansion member by moving the carriage toward or away from, respectively, the substantially rigid frame. As shown in FIG. 3A, a plurality (18 shown) of first (and thus second) wedge members are provided spaced apart along the length of filter panel, with each first wedge member at least partially confronting a second wedge member.

Figure 6A:
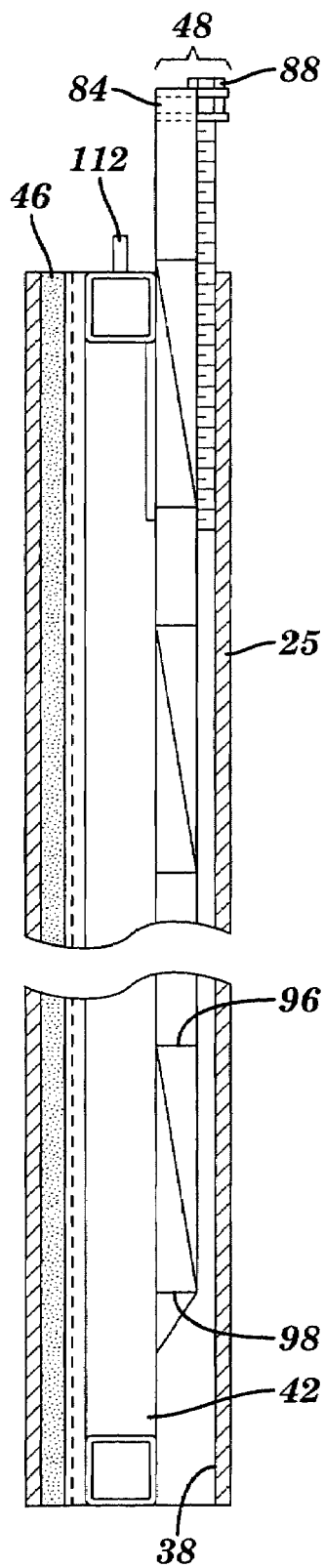
FIGS. 6A-B illustrate the view along lines 6-6 of FIG. 3A, with the expansion members fully illustrated in this view.
Figure 6B:
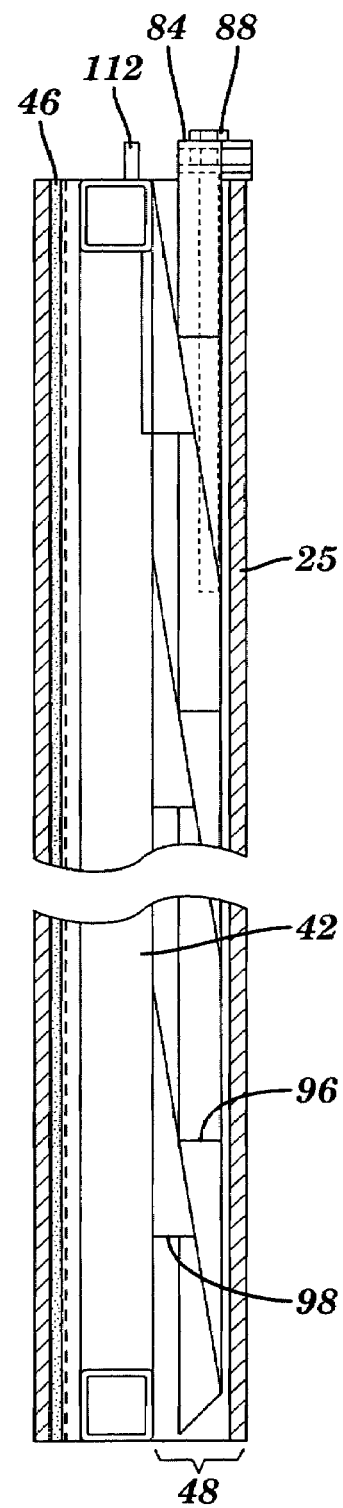
Figure 7:
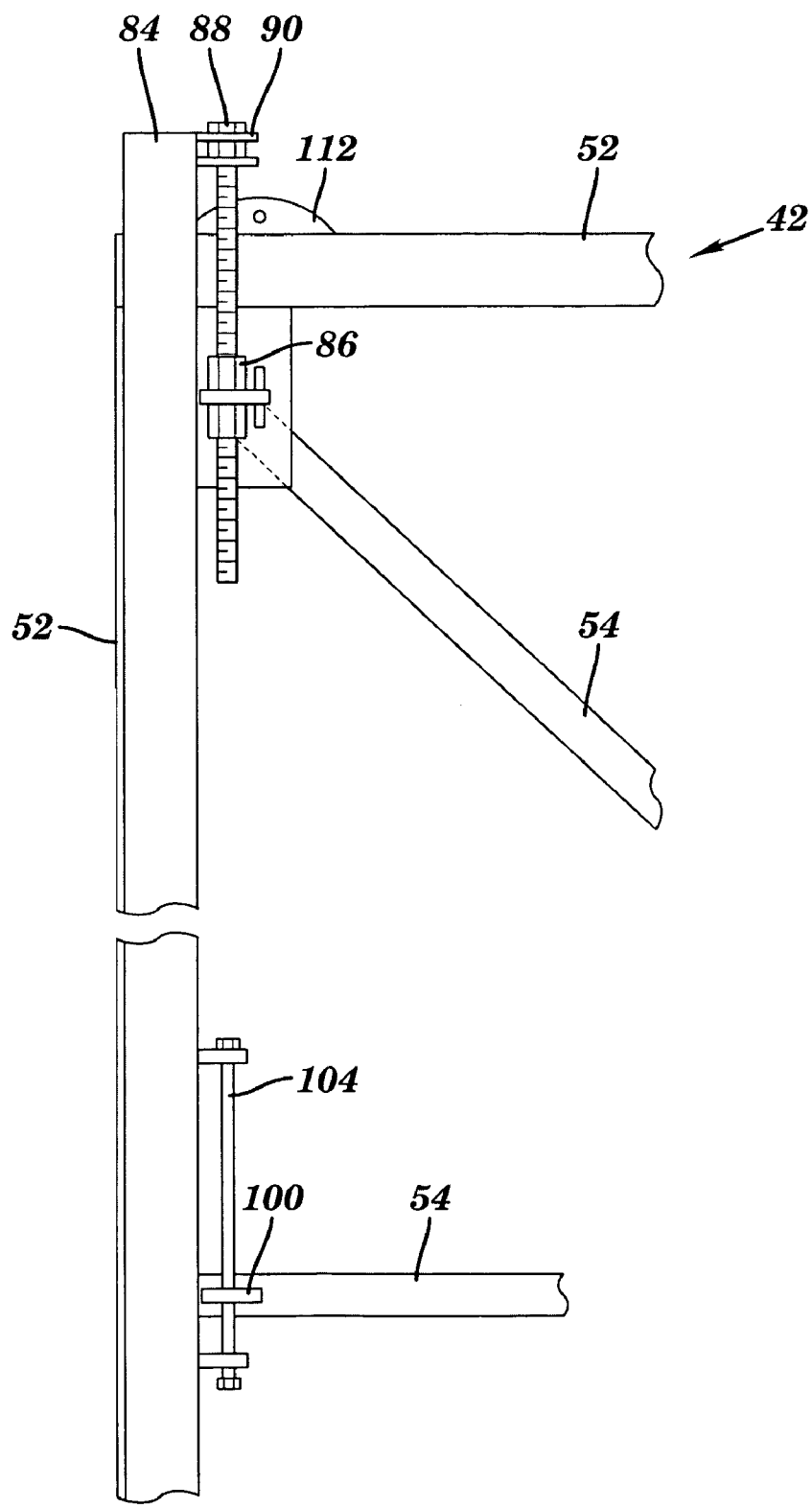
FIG. 7 is an enlarged, partial elevational view illustrating coupling of the carriage and the substantially rigid frame.

With reference to FIGS. 6A-6B, the relationship between movement of the carriage 84 relative to the frame 42 (i.e., between first and second position) is shown. As the carriage 84 moves to facilitate expansion of the expansion member 48, the carriage moves downwardly, allowing first and second wedge members 96,98 (upon contacting the second cooperating surface 38) to force the carriage further away from the frame 42. This has the effect of compressing the sealing member 46 against the first cooperating surface 36.

The first and second wedge members are each preferably formed of a substantially non-elastic material. An exemplary substantially non-elastic material is, without limitation, ultrahigh molecular weight polyethylene.

In addition to the above components, expansion member 48 can further include a guide plate 100 having a slot 102 formed therein, with the guide plate being secured to the cross brace 54 of the substantially rigid frame with the slot aligned substantially perpendicular to the second face of the frame, and a guide bolt 104 secured in fixed position to the carriage 84 with the guide bolt passing through the slot of the guide plate. Once tightened, the guide bolt 104 does not rotate as the carriage moves relative to the frame, but instead merely maintains the alignment of the carriage and frame. As shown in FIG. 3A, a plurality of guide plates and a plurality of corresponding guide bolts are provided.

During use, for purposes of filtering intake water, a substantially rigid structure of the type described above is installed in a body of water and then water filtration panels 40 of the present invention are installed into the panel receiving slots 30, 32 formed by the substantially rigid structure, with the sealing member 46 confronting the first cooperating surface 36 thereof and the expansion member 48 confronting the second cooperating surface 38 thereof. To maintain alignment, the carriage 84 and frame 42 are connected together via nut and carriage bolt 86, 88 as well as guide plates and guide bolts 100, 104. Thereafter, adjustment of the expansion member applies a force between the second face and the second cooperating surface to urge the sealing member to contact the first cooperating surface. Once sealed, water can be drawn into a water intake pipe, whereby substantially all water is drawn through the sheet of fabric material before entering the filtration zone, thereby filtering the water.

To maintain the system or facilitate repairs, the rigid structure preferably includes a first set of panel receiving slots laterally spaced apart from one another along the length of the rigid structure and a second set of panel receiving slots laterally spaced apart from one another along the length of the rigid structure, with the first and second sets of panel receiving slots being spaced apart from one another and aligned to form pairs of first and second panel receiving slots. In this construction, a plurality of water filtration panels are provided in the first (or second) set of panel receiving slots. To facilitate repair or replacement, a plurality of water filtration panels are installed into the second (or first) set of panel receiving slots and then the expansion member is adjusted on each of the plurality of water filtration panels installed in the second (or first) set of panel receiving slots to apply a force between the second face and the second cooperating surface to urge the sealing member to contact the first cooperating surface of said slots. Thus, a new filter has been installed and the old filter can be removed. This is carried out by adjusting the expansion member on each of the plurality of water filtration panels installed in the first (or second) set of panel receiving slots to remove force that had been applied between the second face and the second cooperating surface to urge the sealing member to contact the first cooperating surface of said slots. Once the expansion member has been reduced to its unexpanded state, it is possible to remove the plurality of water filtration panels in the first (or second) set of panel receiving slots, whereby filtration of water continues despite the removal of the plurality of water filtration panels installed in the first (or second) set of panel receiving slots. Removal can be effected using any suitable means; for instance, as shown in FIG. 1, a crane 110 (whether fixed or movable) can be utilized. The panels can be raised/lower into position by coupling the crane lift mechanism to lift tabs 112 formed on the upper end of the frames.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A water filtration panel comprising:
   a substantially rigid frame having a first face, a second face, and an inner dimension;
   a sheet of fabric material that permits water to flow therethrough, the fabric material being secured to the substantially rigid frame in a manner whereby substantially all water passing through the inner dimension of the frame passes through the fabric material;
   a sealing member connected to the first face of the substantially rigid frame for sealing the first face of the substantially rigid frame to a rigid structure; and
   an adjustable expansion member connected to the second face of the substantially rigid frame for adjustably engaging a rigid structure which will exert a sealing force on the sealing member;
   wherein the first and second faces of the substantially rigid frame are on opposite sides of the filtration panel.

2. The water filtration panel according to claim 1 wherein the frame has a substantially rectangular shape.

3. The water filtration panel according to claim 1 wherein the fabric material is a geosynthetic fabric material.

4. The water filtration panel according to claim 3 wherein the geosynthetic fabric material is woven or nonwoven.

5. The water filtration panel according to claim 1 further comprising:
   a retainer comprising opposed first and second sides, an inner edge, and a plurality of spaced passages formed between the first and second sides, the first side being positioned against the substantially rigid frame and having a first recess formed therein, and the inner edge having a rabbet formed at the junction of the inner edge and the first side, the rabbet communicating with the first recess; and a plurality of connectors each extending through one of the plurality of passages to connect the retainer to the substantially rigid frame.

6. The water filtration panel according to claim 5 wherein the sealing member is adhesively secured to the second side of the retainer.

7. The water filtration panel according to claim 5 wherein the retainer further comprises a second recess formed in the second side thereof, wherein the second recess receives the sealing member.

8. The water filtration panel according to claim 7 wherein the sidewalls defining the second recess are provided with a shoulder to frictionally restrain the sealing member.

9. The water filtration panel according to claim 5 wherein the sheet of fabric material comprises a sleeve formed about the perimeter thereof, the sleeve containing a locking member that extends about substantially the entire perimeter.

10. The water filtration panel according to claim 9 wherein the locking member is characterized by a dimension that is larger than the dimension of the rabbet.

11. The water filtration panel according to claim 9 wherein the locking member is in the form of a nylon rope or a rigid rod.

12. The water filtration panel according to claim 9 wherein the sheet of fabric material comprises a reinforcing fabric that overlaps the fabric material forming the sleeve.

13. The water filtration panel according to claim 1 wherein the substantially rigid frame is elongate and comprises a plurality of bracing members that span the inner dimension.

14. The water filtration panel according to claim 1 wherein the sealing member is formed of a resilient foam material.

15. The water filtration panel according to claim 14 wherein the resilient foam material is a foam neoprene material.

16. The water filtration panel according to claim 1 wherein the expansion member comprises:
a carriage connected to the substantially rigid frame, the carriage being adjustable between a first position and a second position along the length of the substantially rigid frame;
at least one first wedge member connected to the carriage with a tapered surface thereof facing the second face of the substantially rigid frame; and
at least one second wedge member connected to the second face of the substantially rigid frame with a tapered surface thereof at least partially confronting the tapered surface of the at least one first wedge,
whereby adjustment of the carriage from the first position toward the second position moves the at least one first wedge member relative to the at least one second wedge member and thereby expands the expansion member by moving the carriage away from the substantially rigid frame.

17. The water filtration panel according to claim 16 wherein the at least one first wedge member and the at least one second wedge member comprises a plurality of first and second wedge members, with each first wedge member at least partially confronting a second wedge member.

18. The water filtration panel according to claim 17 wherein the plurality of first wedge members are spaced apart and the plurality of second wedge members are similarly spaced apart.

19. The water filtration panel according to claim 16 wherein each of first and second wedge members is formed of a substantially non-elastic material.

20. The water filtration panel according to claim 19 wherein the substantially non-elastic material is polyethylene.

21. The water filtration panel according to claim 16 wherein the expansion member expands in a direction substantially perpendicular to the length of the substantially rigid frame.

22. The water filtration panel according to claim 16 further comprising:
an internally threaded coupler nut secured to the substantially rigid frame; and
a rotatable carriage bolt secured to the carriage, the carriage bolt having an externally threaded portion engaging the coupler nut, whereby rotation of the carriage bolt causes the expansion member to move between the first and second positions.

23. The water filtration panel according to claim 22 further comprising a retaining plate having a slot formed therein, the retaining plate being secured to the carriage with the rotatable carriage bolt passing through the slot.

24. The water filtration panel according to claim 23 further comprising:
a guide plate having a slot formed therein, the guide plate being secured to the substantially rigid frame with the slot aligned substantially perpendicular to the second face; and
a guide bolt secured in fixed position to the carriage, the guide bolt passing through the slot of the guide plate.

25. The water filtration panel according to claim 24 wherein a plurality of guide plates and a plurality of corresponding guide bolts are provided.

26. The water filtration panel according to claim 24 wherein the slots of the retaining plate and the guide plates are co-aligned substantially perpendicular to the length of the substantially rigid frame.

27. A water filtration system comprising:
a substantially rigid structure that defines a panel receiving slot having first and second cooperating surfaces;
a water filtration panel according to claim 1 which is positioned in the panel receiving slot with the sealing member confronting the first cooperating surface and the expansion member confronting the second cooperating surface,
whereby adjustment of the expansion member applies a removable force between the second face and the second cooperating surface to urge the sealing member to contact the first cooperating surface.

28. The water filtration system according to claim 27 wherein the rigid structure comprises a plurality of panel receiving slots, each having first and second cooperating surfaces, the combination further comprising a plurality of the water filtration panels.

29. The water filtration system according to claim 28 wherein the plurality of panel receiving slots comprise:
a first set of panel receiving slots laterally spaced apart from one another along the length of the rigid structure; and
a second set of panel receiving slots laterally spaced apart from one another along the length of the substantially rigid structure, with the first and second sets of panel receiving slots being spaced apart from one another and aligned to form pairs of first and second panel receiving slots,
wherein the plurality of water filtration panels are present in one or both of the first and second panel receiving slots for each pair thereof.

30. The water filtration system according to claim 29 wherein the plurality of water filtration panels are present in one but not both of the first and second panel receiving slots for each pair thereof.

31. The water filtration system according to claim 29 further comprising:
a third set of slots laterally spaced apart from one another along the length of the substantially rigid structure, with the third set of slots being spaced apart from one another and each being aligned with a pair of first and second panel receiving slots; and
a bar rack secured within each of the third set of slots.

32. The water filtration system according to claim 27 wherein the substantially rigid structure comprises:
a plurality of substantially vertical pilings;
a plurality of substantially horizontal girders; and
a plurality of substantially vertical girders, each connected to at least one of either the vertical pilings or the horizontal girders, wherein two adjacent vertical girders together define the panel receiving slot.

33. The water filtration system according to claim 32 wherein two adjacent vertical girders together define a pair of panel receiving slots.

* * * * *